United States Patent
Bohn

(10) Patent No.: US 9,977,216 B2
(45) Date of Patent: May 22, 2018

(54) PASSIVE LENS ATHERMALIZATION USING LIQUID LENS

(71) Applicant: MICROSOFT TECHNOLOGY LICENSING, LLC, Redmond, WA (US)

(72) Inventor: David D. Bohn, Fort Collins, CO (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days. days.

(21) Appl. No.: 15/210,697

(22) Filed: Jul. 14, 2016

(65) Prior Publication Data

US 2018/0017757 A1  Jan. 18, 2018

(51) Int. Cl.
| G02B 1/06 | (2006.01) |
| G02B 3/12 | (2006.01) |
| G02B 7/02 | (2006.01) |
| G02B 3/14 | (2006.01) |

(52) U.S. Cl.
CPC ............ *G02B 7/028* (2013.01); *G02B 3/12* (2013.01); *G02B 3/14* (2013.01)

(58) Field of Classification Search
CPC .................................. G02B 3/12; G02B 3/14
USPC .................................................. 359/665, 666
See application file for complete search history.

(56) References Cited

U.S. PATENT DOCUMENTS

| 6,188,526 B1 | 2/2001 | Sasaya et al. |
| 6,618,208 B1 | 9/2003 | Silver |
| 7,499,223 B2 | 3/2009 | Berge et al. |
| 7,755,841 B2 | 7/2010 | Christenson et al. |
| 8,000,022 B2 | 8/2011 | Niederer |
| 8,305,691 B2 | 11/2012 | Havens et al. |

(Continued)

FOREIGN PATENT DOCUMENTS

| EP | 1870742 A1 | 12/2007 |
| EP | 2396692 A1 | 12/2011 |

(Continued)

OTHER PUBLICATIONS

Epps, et al., "Athermalizing Refractive Optics with Fluid Lenses", In Publications of the Astronomical Society of the Pacific, Nov. 2002, pp. 1252-1259.

(Continued)

*Primary Examiner* — William Choi
(74) *Attorney, Agent, or Firm* — Alleman Hall Creasman & Tuttle LLP

(57) ABSTRACT

An optical system includes a liquid lens and an adjustment structure. The liquid lens includes an optically-active region and an adjustment region that is not optically-active. The adjustment region has a volume that corresponds to an optical parameter of the optically-active region. The adjustment structure is configured to interface with the adjustment region. The adjustment structure includes a first portion having a first coefficient of thermal expansion and a second portion having a second coefficient of thermal expansion that differs from the first coefficient of thermal expansion. The first portion and the second portion are configured to collectively change the volume of the adjustment region throughout an operational temperature range of the optical system based on the first coefficient of thermal expansion of and the second coefficient of thermal expansion.

18 Claims, 4 Drawing Sheets

(56) References Cited

U.S. PATENT DOCUMENTS

| | | |
|---|---|---|
| 8,487,228 B2 | 7/2013 | Nunnink |
| 8,649,102 B2 | 2/2014 | Berge et al. |
| 8,947,784 B2 | 2/2015 | Kern |
| 2007/0201138 A1 | 8/2007 | Lo |
| 2008/0277480 A1 | 11/2008 | Thuries et al. |
| 2011/0007161 A1 | 1/2011 | Batchko et al. |
| 2011/0013287 A1 | 1/2011 | Huang et al. |
| 2012/0081795 A1* | 4/2012 | Choi .................... G02B 3/14 359/665 |
| 2015/0028195 A1 | 1/2015 | King et al. |

FOREIGN PATENT DOCUMENTS

| | | |
|---|---|---|
| EP | 2439563 A1 | 4/2012 |
| WO | 2016087602 A1 | 6/2016 |

OTHER PUBLICATIONS

"International Search Report and Written Opinion Issued in PCT Application No. PCT/US2017/040567", dated Oct. 6, 2017, 11 Pages.

\* cited by examiner

PASSIVE LENS ATHERMALIZATION USING LIQUID LENS

BACKGROUND

An optical system may include one or more optical elements through which light passes, for example, so that the light is focused onto an image sensor of a camera. Various optical characteristics of the optical elements may change based on operating temperature. These thermally-induced changes may cause one or more optical parameters to change. For example, a focus of the optical system may shift as a function of temperature.

DETAILED DESCRIPTION

Thermally-induced changes in optical characteristics of an optical system may cause undesired changes to optical parameters in one or more portions of the optical system. Such changes to the optical parameters may undesirably vary performance/behavior of the optical system. For example, a refractive index of one or more optical elements in the optical system may change throughout an operational temperature range of the optical system. Correspondingly, overall focus of the optical system may shift away from a designed/intended focus of the optical system at some temperatures in the operational temperature range, such as at upper and lower edges of the operational temperature range.

The present disclosure is directed to an optical system configured to automatically counter thermally-induced changes to optical parameters of the optical system over an operational temperature range of the optical system. In particular, the optical system includes a liquid lens and an adjustment structure. The adjustment structure is configured to passively adjust an optical parameter of the liquid lens, for example to counter a thermally-induced shift in focus of other optical elements in the optical system throughout the operational temperature range. The adjustment structure may include different materials having different coefficients of thermal expansion (CTEs). The different CTEs are configured to cause a desired change in volume of an adjustment region of the liquid lens, so as to correspondingly cause a desired change in volume of an optically-active region of the liquid lens as the operating temperature changes. Such a desired change in volume of the optically-active region adjusts an optical parameter of the optically-active region. The adjustment of the optical parameter counters the shift in focus of other optical elements the optical system. In other words, the CTEs of the different portions of the adjustment structure are tuned to change the optical parameter of the liquid lens to passively athermalize the focus shift of the other optical elements of the optical system. Accordingly, the optical system can maintain a designed focus throughout the operational temperature range even as thermally-induced changes of individual optical components occur.

Figure 1:
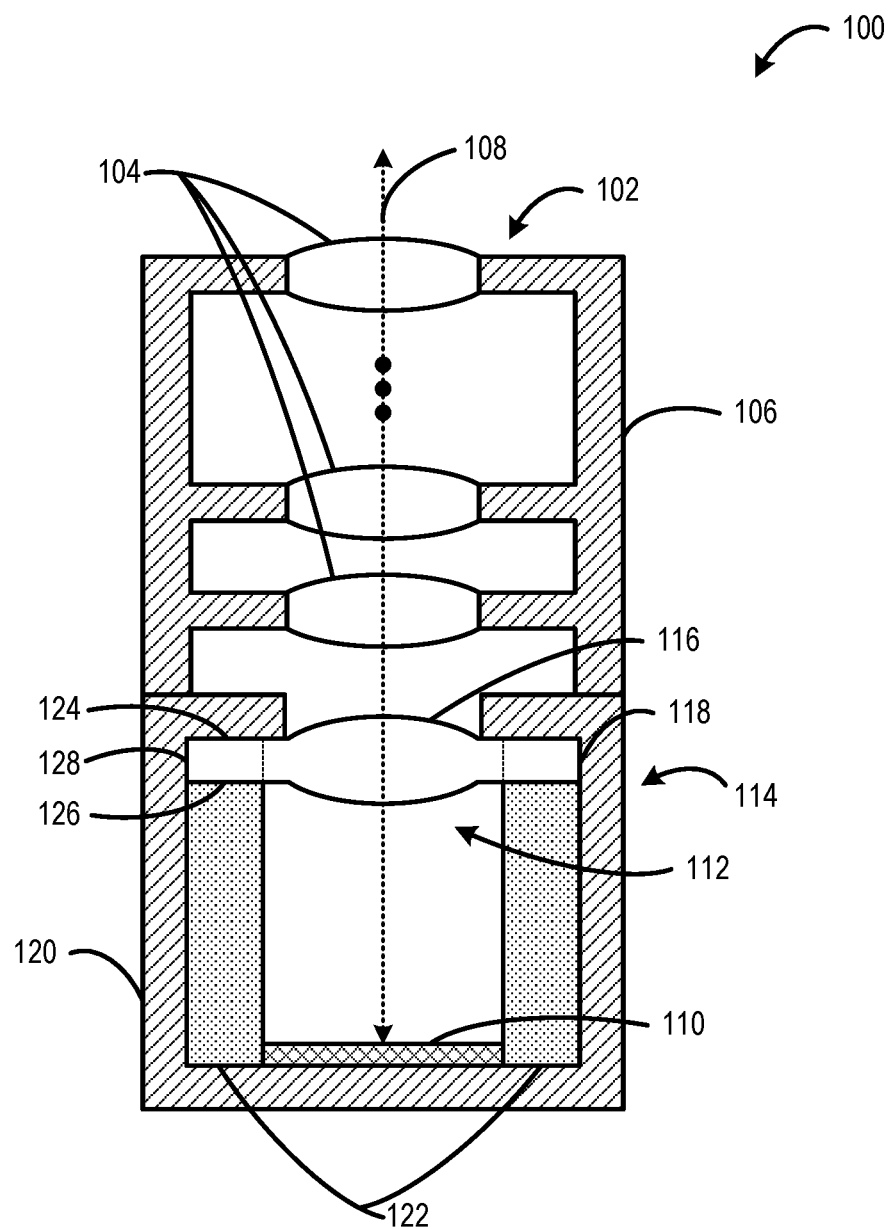
FIG. 1 shows a camera including an optical system.

FIG. 1 schematically shows a camera 100. The camera includes an optical system 102, including a plurality of optical elements 104 mounted in the camera 100 via a mounting structure 106. The optical elements 104 are configured to modify and/or direct light along an optical axis 108 to an image sensor 110.

The camera 100 may take any suitable form. Non-limiting examples of the camera 100 include a line-scan camera, a wide-angle video conference camera, a depth camera, a vehicle backup camera, a motion sensing camera, and a head-mounted display device camera. Generally, the camera 100 and/or the optical system 102 may be referred to as having a fixed focus. A fixed focus means that the optical system maintains substantially the same focal point (e.g., ±5% of the distance) over an entire operational temperature range of the optical system 102. However, the concepts described herein are broadly applicable to cameras and/or optical systems having portions or components that have adjustable focus or autofocus. Further, such concepts may be applicable to digital camera, film cameras, and any other optical systems that can be affected by temperature changes.

The optical system 102 may include any suitable type and/or number of optical elements 104 arranged in any suitable manner. For example, the optical system 102 may include just one optical element 104. In another example, the optical system 102 may include 6-8 optical elements 104, or more. Non-limiting examples of the optical elements 104 include lenses, filters, beam splitters, coatings, and gratings. Moreover, such optical elements may include any suitable type of material(s), including, but not limited to, glass and various types of plastic.

Throughout the operational temperature range of the camera 100, thermally-induced changes in optical characteristics of the optical elements 104 may occur over an operational temperature range of the optical system 102. For example, a refractive index of the material that makes up the optical element 104 may change based on temperature. Such a change in refractive index may be particularly large for high-refractive index materials, such as plastic lenses. In another example, a shape of the optical elements 104 may change based on temperature. The example devices herein may be configured to adjust for temperature-induced changes in a wide range of optical characteristic.

As indicated above, thermally-induced changes in optical characteristics of the optical elements 104 can cause an inadvertent shift in a collective focus of the optical system 102. In order to counteract the thermally-induced focus shift, the optical system 102 includes a liquid lens 112 having optical parameters that can be adjusted via interaction with an adjustment structure 114. The adjustment structure 114 includes materials of varying CTEs that are collectively tuned to interact with the liquid lens 112. In particular, the adjustment structure 114 adjusts the optical parameters of the liquid lens 112 to counteract the focus shift of the optical system 102.

Note that the adjustment structure 114 may be configured to adjust one or more optical parameters of the liquid lens 112 to maintain a fixed focus of the entire optical system 102 or a focus of any subcomponent/subsystem of the optical system 102.

The operational temperature range of the camera 100 may be predetermined during design of the camera 100. For example, the lower boundary of the operational temperature range may be defined as a temperature of the camera 100 when the camera 100 is in a cold startup condition or in otherwise cold conditions. On the other hand, the upper boundary of the operation temperature range may be defined as a temperature of the camera 100 when the camera is performing processor intensive operations in a hot environment.

Furthermore, the camera 100 and/or the optical system 102 may be designed based on a nominal operating temperature within the operational temperature range. For example, the nominal operating temperature may be an average temperature of operation of the camera 100 and/or optical system 102. At the nominal operating temperature, for example, it may be assumed that the camera 100 and/or optical system 102 has an accurate focus—i.e., not substantially shifted from the desired focus of the optical system 102. When the operating temperature of the optical system 102 varies from this, i.e., moves away from the nominal operating temperature towards the upper or lower temperature boundaries, the optical characteristics of the optical elements 104 change to cause the inadvertent focus shift.

The liquid lens 112 may be a sealed membrane containing a fixed volume of transparent liquid. It may have an external shape that can be manipulated via interaction of the lens with adjustment structure 114. In particular, the liquid lens 112 includes a centrally-located optically-active region 116 that may be surrounded by an adjustment region 118 that is annular in shape. In other words, the adjustment region 118 is similar in shape to a washer. The optically-active region 116 is positioned in the optical system 102 such that light is directed into and modified by the optically-active region 116, though in some states the optically-active region may pass the light substantially without modification (e.g., operating as simple glass). The adjustment region 118 may be positioned in the optical system 102 such that the adjustment region 118 is not optically-active. In other words, light that travels through the optical system 102 is not directed into the adjustment region 118.

The liquid lens 112 may take any suitable shape and may be manipulated via shape changes or otherwise in order to counter a focus shift of the optical system 102. For example, the liquid lens 112 may have an initial shape that is substantially flat (e.g., a window) and may be distorted to have a convex shape (on one or both sides). In another example, the liquid lens 112 may distort to a concave shape (on one or both sides).

The central optically-active region 116 and the adjustment region 118 are fluidly connected such that the adjustment region 118 provides a reservoir of fluid to change the amount of fluid in the optically-active region 116. In particular, a volume of the adjustment region 118 can be adjusted via interaction with the adjustment structure 114, so as to cause fluid to flow in and out of the central optically-active region 116, thereby changing a shape of the optically-active region 116. Such a change in shape of the optically-active region 116 causes a corresponding change of one or more optical parameters of the liquid lens 112. In one particular example, the optical power of the liquid lens 112 is the optical parameter that is changed based on the shape of the optically-active region 116. Stated another way, the adjustment region 118 has a volume that corresponds to the optical power of the optically-active region 116. As such, the volume of the adjustment region 118 can be manipulated by the adjustment structure 114 to adjust the optical power of the liquid lens 112.

The adjustment structure 114 is configured to passively manipulate the volume of the adjustment region 118 throughout the operational temperature range of the optical system 102. Such manipulation is tuned to change the optical power of the liquid lens 112 to counter the thermally-induced focus shift of the optical system 102 in order to maintain desired fixed focus of the optical system 102, or portions thereof, throughout the operational temperature range. For example, if the change in focus is an increases in focal length by a distance such that the focal length moves away from the optical system 102 as the operating temperature increases, then the adjustment structure 114 may be configured to increase the optical power of the liquid lens 112 in relation to the distance of the shift in focal length in order to maintain the same focus even as the operating temperature changes.

The adjustment structure 114 includes a first portion 120 and a second portion 122. The first portion 120 interfaces with a first side 124 of the adjustment region 118. The second portion 122 interfaces with an opposing second side 126 of the adjustment region 118. Further, the first portion 120 of the adjustment structure interfaces with a third side 128 of the adjustment region 118, the third side being perpendicular to or otherwise non-parallel to the first and second sides. The third side 128 corresponds to the outer perimeter edge of the liquid lens 112. The first portion 120 and the second portion 122 of the adjustment structure collectively clamp the adjustment region 118 to hold the liquid lens 112 in a substantially fixed position in the optical system 102. In other words, the adjustment structure 114 may play a dual role of mounting/holding the liquid lens 112 and adjusting the optical power or other parameter of the liquid lens 112. In some implementations, the adjustment structure 114 may adjust the liquid lens 112 without mounting the liquid lens 112 in the optical system 102, as will be discussed in further detail below with reference to FIGS. 4A-4B.

The first portion 120 and the second portion 122 may be made of different materials that have different thermal properties. In particular, the first portion 120 has a first CTE and the second portion 122 has a second CTE that differs from the first CTE. The first portion 120 and the second portion 122 are configured to collectively change the volume of the adjustment region 118 throughout the operational temperature range of the optical system 102 based on the first CTE and the second CTE. In other words, the difference between the first and second CTEs allows the first portion 120 and the second portion 122 to differentially expand and contract as a function of temperature over the operational temperature range of the optical system 102. Such a relationship allows the first and second portions 120 and 122 to collectively compress/decompress the adjustment region 118 in a controlled and intentional way, so as to desirably change the volume of fluid in the adjustment region 118.

The first and second portions 120 and 122 of the adjustment structure may be made of any suitable combination of different materials. In particular, the material may be selected to achieve a precise relationship between the first and second CTEs that allows the optical power of the liquid lens 112 to counter the focus shift of the optical system 102 as the operating temperature changes. In one example, the first portion 120 includes a material having a relatively higher CTE (e.g., 23 ppm/degrees C.) and the second portion 122 includes a material having a relatively lower CTE (e.g., 6-8 ppm/degrees C.). In another example, the first portion 120 includes a material having a relatively lower CTE and the second portion 122 includes a material having a relatively higher CTE. In one example, the first portion 120 includes a metal, such as aluminum, and the second portion 122 includes glass. In another example, the first and second portions 120 and 122 may be made of different types of plastics having different CTEs. In another example, the first and second portions 120 and 122 may be made of different types of metals having different CTEs. The first and second portions 120 and 122 may be made of any suitable materials. Furthermore, the first and second portions 120 and 122 may have any suitable size and dimensions with consideration of the different CTEs to suitably adjust the optical power of the liquid lens 112 to counter a focus shift of the optical system 102 as the operating temperature changes.

In some implementations, the first CTE of the first portion 120 and the second CTE of the second portion 122 are collectively configured to change the volume linearly throughout at least a portion of the operational temperature range of the optical system 102. In some implementations, the first CTE of the first portion 120 and the second CTE of the second portion 122 are collectively configured to change the volume non-linearly throughout at least a portion of the operational temperature range of the optical system 102. Such non-linear adjustment may be appropriate to compensate for optical elements that also behave in a non-linear manner relative to temperature. Non-limiting examples of such optical elements may include different types of polymers (e.g., thermoplastic, thermoset) and epoxy.

Via implementation of the above examples, the liquid lens 112, in combination with the adjustment structure 114, can passively athermalize the optical system 102. In other words, due to the selected thermal properties of the first and second portions of the adjustment structure 114, it can adjust the optical power of the liquid lens 112 without any external active (e.g. electrical, mechanical) components. In many settings, this type of passive mechanism can reduce cost, complexity, and component sizes, among other benefits.

The adjustment structure 114 may passively adjust the volume of the adjustment region 118 of the liquid lens 112 in any suitable manner. FIGS. 2-4 show different configurations of the adjustment structure 114 that adjust the volume of the adjustment region 118 of the liquid lens 112 differently.

Figure 2A:
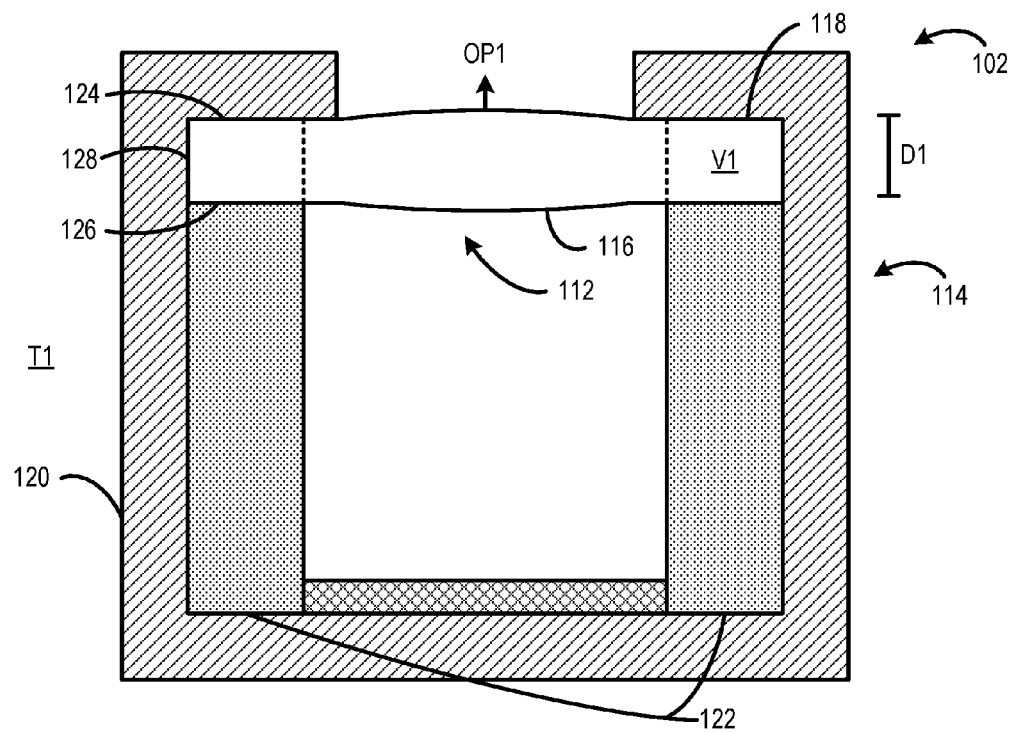
FIGS. 2A-2B show an optical system including a liquid lens having an optical parameter that is varied by a passive adjustment structure based on an increase in temperature of the optical system.
Figure 2B:
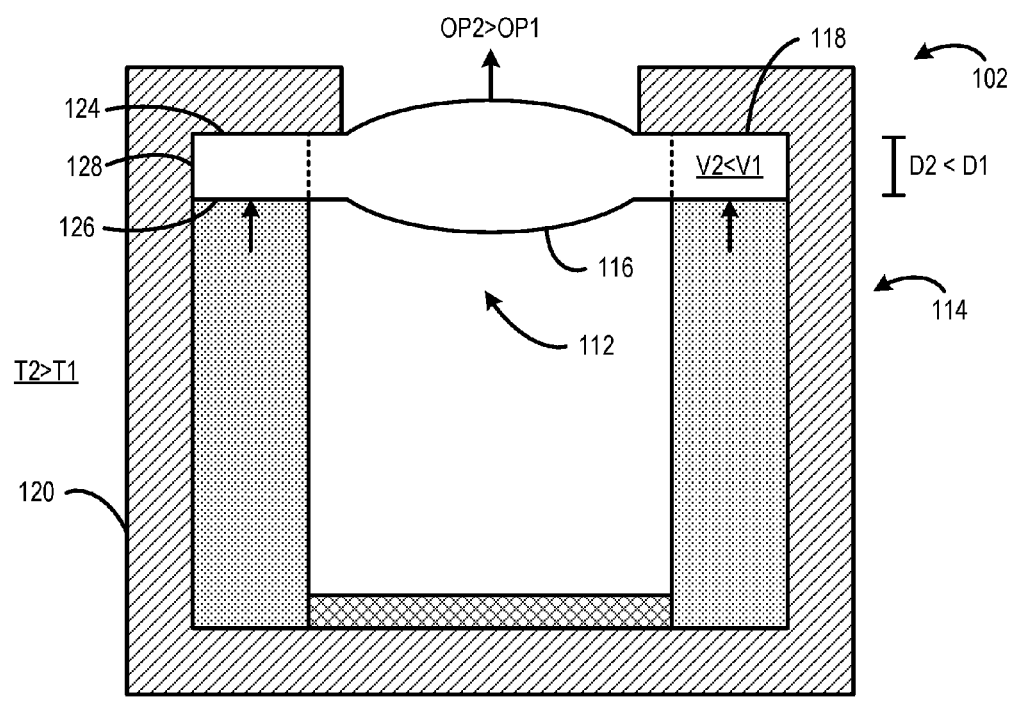

In FIGS. 2A and 2B, the adjustment structure 114 decreases a fluid volume of the adjustment region 118 to increase a fluid volume of the optically-active region 116 of the liquid lens 112 as the operating temperature increases. In FIG. 2A, the optical system 102 has an operating temperature T1 and the first portion 120 and the second portion 122 of the adjustment structure 114 are separated by a distance D1. In other words, the first and second portions 120 and 122 collectively squeeze the adjustment region 118 of the liquid lens 112 such that the adjustment region 118 has a volume V1 that causes the optically-active region 116 to have an optical power OP1.

In FIG. 2B, the optical system 102 has an operating temperature T2 that is greater than T1. The increase in temperature causes a focus shift of the optical system 102 in which a distance between the optical system 102 and the focus increases. To counter this focus shift, the second portion 122 moves closer to the first portion 120 such that the first and second portions 120 and 122 are separated by a distance D2 that is less than D1. In particular, the second portion 122 has a CTE that is higher than the CTE of the first portion 120 that causes the second portion 122 to expand more as function of temperature relative to the first portion 120. At the distance D2, the first and second portions 120 and 122 collectively squeeze the adjustment region 118 of the liquid lens 112. This causes the first side 124 and the second side 126 to move towards each other to reduce the volume of the adjustment region 118 from the volume V1 to a volume V2. Correspondingly, as the volume of the adjustment region 118 decreases, the volume the optically-active region 116 increases and the shape of the optically-active region 116 changes to increase the optical power from OP1 to OP2. The difference of optical power OP1 and optical power OP2 counteracts the focus shift such that the optical system 102 maintains a same focus even as the operating temperature changes from temperature T1 to T2.

Note that the different operating temperatures T1 and T2 may represent any suitable temperatures within the operational temperature range of the optical system 102. For example, both temperatures could be at a lower end of the temperature range, both temperature could be at the higher end of the temperature range, or one temperature could be at the lower end of the temperature range and one temperature could be at the upper end of the temperature range.

Figure 3A:
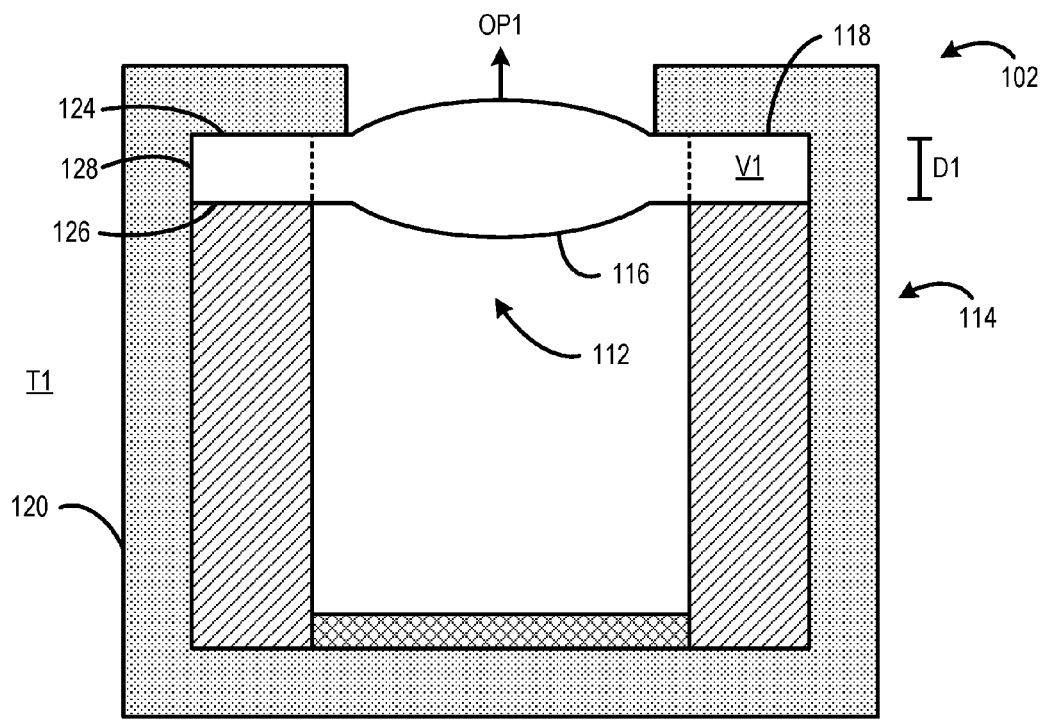
FIGS. 3A-3B show an optical system including a liquid lens having an optical parameter that is varied by a passive adjustment structure based on an increase in temperature of the optical system.
Figure 3B:
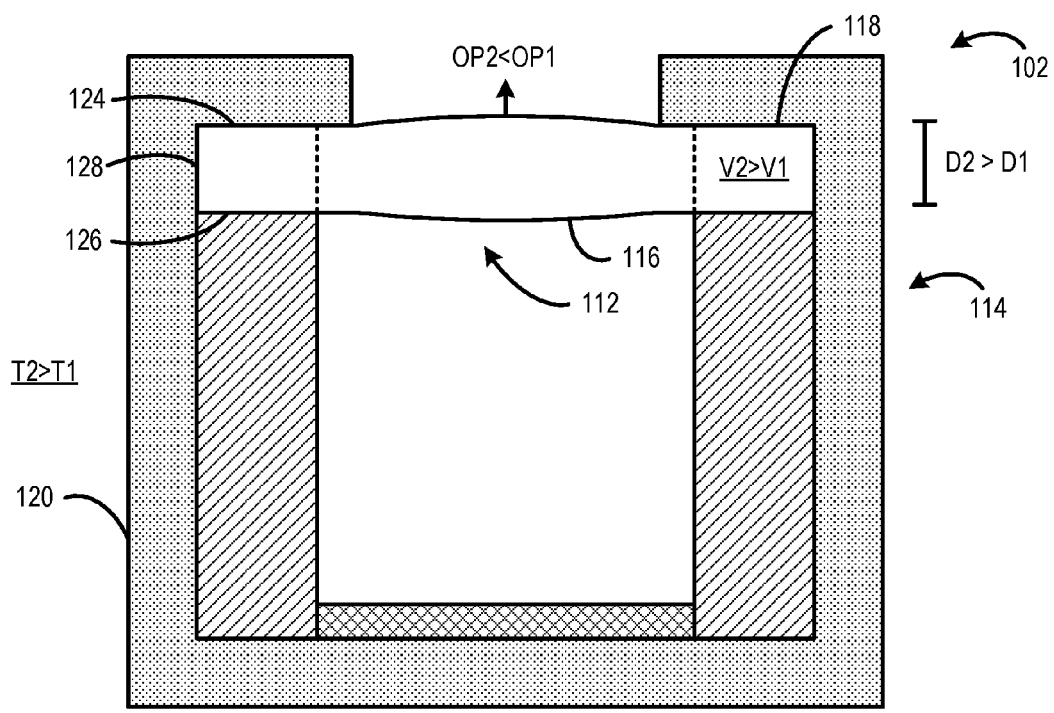

In FIGS. 3A and 3B, the adjustment structure 114 increases a fluid volume of the adjustment region 118 to decrease a fluid volume of the optically-active region 116 of the liquid lens 112 as the operating temperature increases. In FIG. 3A, the optical system 102 has an operating temperature T1 and the first portion 120 and the second portion 122 of the adjustment structure 114 are separated by a distance D1. In other words, the first and second portions 120 and 122 collectively squeeze the adjustment region 118 of the liquid lens 112 such that the adjustment region 118 has a volume V1 that causes the optically-active region 116 to have an optical power OP1.

In FIG. 3B, the optical system 102 has an operating temperature T2 that is greater than T1. The increase in temperature causes a focus shift of the optical system 102 in which a distance between the optical system 102 and the focus decreases. To counter this focus shift, the second portion 122 moves further away from the first portion 120 such that the first and second portions 120 and 122 are separated by a distance D2 that is greater than D1. In particular, the second portion 122 has a CTE that is lower than the CTE of the first portion 120, so as to cause the first portion 120 to expand more as a function of temperature relative to the second portion 122. At the distance D2, the first and second portions 120 and 122 collectively squeeze the adjustment region 118 of the liquid lens 112. This causes the first side 124 and the second side 126 to move away from each other to increase the volume of the adjustment region 118 from the volume V1 to a volume V2. Correspondingly, as the volume of the adjustment region 118 increases, the volume of the optically-active region 116 decreases and the shape of the optically-active region 116 changes to decrease the optical power from OP1 to OP2. The difference of optical power OP1 and optical power OP2 counteracts the focus shift such that the optical system 102 maintains a same focus even as the operating temperature changes from temperature T1 to T2.

Note that the different operating temperatures T1 and T2 may represent any suitable temperatures within the operational temperature range of the optical system 102. For example, both temperatures could be at a lower end of the temperature range, both temperature could be at the higher end of the temperature range, or one temperature could be at the lower end of the temperature range and one temperature could be at the upper end of the temperature range.

In the configuration of FIGS. 2A and 2B, the optical power of the liquid lens increases as the operating temperature increases to counter a focus shift. In the configuration of FIGS. 3A and 3B, the optical power of the liquid lens decreases as the operating temperature increases to counter a focus shift. In both configurations, the adjustment structure 114 adjusts the optical power of the liquid lens 112 by changing the volume of an annular adjustment region 118. In such configurations, the adjustment structure 114 acts as a mounting component and an adjustment component for the liquid lens 112.

Figure 4A:
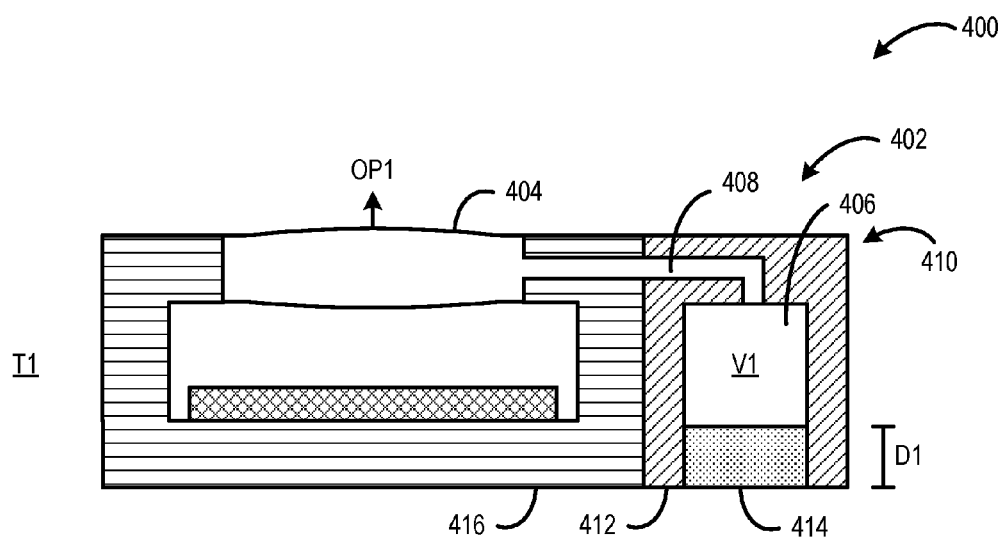
FIGS. 4A-4B show an optical system including a liquid lens having an adjustment region separated from an optically-active region by a passive adjustment structure.
Figure 4B:
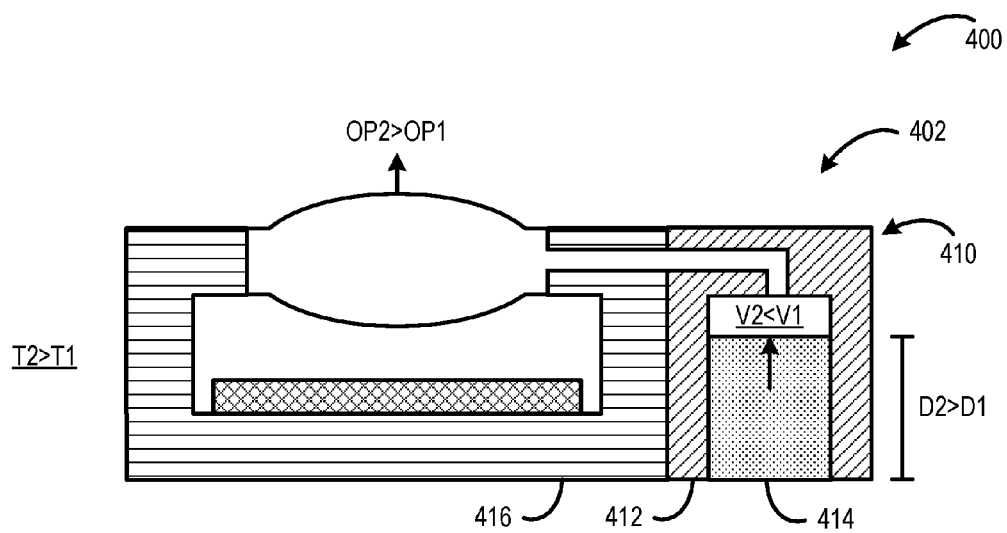

FIGS. 4A and 4B show another optical system 400 including a liquid lens 402 including an optically-active region 404 and an adjustment region 406 that is separated from the optically-active region 404. An adjustment structure 410 surrounds the adjustment region 406 such that the adjustment region 406 is separated from the optically-active region 404 by at least a portion of the adjustment structure 410. In particular, the adjustment structure 410 includes a first portion 412 and a second portion 414 that collective form a piston chamber to adjust a volume of the adjustment region 406. The first portion 412 has a lower CTE relative to a CTE of the second portion 414. As such, the second portion 414 expands more as a function of temperature relative to the first portion 412 as the temperature increases. Such a relationship allows the volume of the adjustment region 406 to be passively adjusted as the operating temperature changes to change the optical power of the optically-active region 404. The optically-active region 404 is mounted in the optical system 400 via a mounting structure 416 that is separate from the adjustment structure 410. In some implementations, the adjustment structure 410 also is configured to mount the optically-active region 404 in the optical system 400.

In FIG. 4A, the optical system 400 has an operating temperature T1 and the second portion 414 extends a first distance D1 into the first portion 412 of the adjustment structure 410 such that the adjustment region 406 has a volume V1 that causes the optically-active region 404 to have an optical power OP1.

In FIG. 4B, the optical system 400 has an operating temperature T2 that is greater than T1. The increase in temperature causes a focus shift of the optical system 400 in which a distance between the optical system 400 and the focus increases. To counter this focus shift, the second portion 414 expands to a second distance D2 that is greater than the first distance D1 into the piston chamber formed by the first portion 412. At the distance D2, the first and second portions 412 and 414 collectively squeeze the adjustment region 406 of the liquid lens 402 to reduce the volume of the adjustment region 406 from the volume V1 to a volume V2. Correspondingly, as the volume of the adjustment region 406 decreases fluid is pumped through the conduit 408 to increase the volume of the optically-active region 404 and change the shape of the optically-active region 404 to increase the optical power from OP1 to OP2. The difference of optical power OP1 and optical power OP2 counteracts the focus shift such that the optical system 400 maintains a same focus even as the operating temperature changes from temperature T1 to T2.

Note that the different operating temperatures T1 and T2 may represent any suitable temperatures within the operational temperature range of the optical system 102. For example, both temperatures could be at a lower end of the temperature range, both temperature could be at the higher end of the temperature range, or one temperature could be at the lower end of the temperature range and one temperature could be at the upper end of the temperature range.

In the above described examples, the liquid lens is a bi-convex lens that is manipulated by the adjustment structure to change a degree of "bi-convexity" of the lens. The liquid lens may take any suitable form, and may be manipulated to assume any other suitable form. Moreover, the adjustment structure may be configured to passively manipulate the liquid lens to adjust one or more optical parameters of the liquid lens in any suitable manner. In particular, the adjustment structure can compress/decompress different portions of the liquid lens to vary a lens shape and optical parameters in a variety of ways. For example, the adjustment structure may be configured to compress a portion of the liquid lens to produce any shape change, in any type of lens, from any starting state, and vice versa.

In another example, an optical system, comprises a liquid lens including an optically-active region and an adjustment region that is not optically-active, the adjustment region having a volume that corresponds to an optical parameter of the optically-active region, an adjustment structure configured to interface with the adjustment region, the adjustment structure including a first portion having a first coefficient of thermal expansion and a second portion having a second coefficient of thermal expansion that differs from the first coefficient of thermal expansion, and wherein the first portion and the second portion are configured to collectively change the volume of the adjustment region throughout an operational temperature range of the optical system based on the first coefficient of thermal expansion of and the second coefficient of thermal expansion. In this example, the optically-active region may be centrally located in the liquid lens, and the adjustment region may be annular and surrounds the centrally-located optically-active region. In this example, the adjustment region may include a first side and a second side that opposes the first side, and the first portion of the adjustment structure may interface with the first side and the second portion of the adjustment structure interfaces with the second side. In this example, the first portion and the second portion of the adjustment structure may cause the first side and the second side of the adjustment region to move towards each other to reduce the volume of the adjustment region as an operating temperature of the optical system increases within the operational temperature range. In this example, the first portion and the second portion of the adjustment structure may cause the first side and the second side of the adjustment region to move away from each other to increase the volume of the adjustment region as an operating temperature of the optical system increases within the operational temperature range. In this example, the adjustment region may be separated from the optically-active region by at least one of the first portion and the second portion of the adjustment structure, and the liquid lens may include a conduit fluidly connecting the optically-active region and the adjustment region. In this example, the first portion and the second portion may be collectively configured to mount the liquid lens in the optical system. In this example, the optical system may further comprise one or more optical elements, and the first portion and the second portion of the adjustment structure may be configured to collectively change the volume of the adjustment region throughout the operational temperature range of the optical system, such change being based on the first coefficient of thermal expansion and the second coefficient of thermal expansion, and such change being configured to cause the optical parameter of the optically-active region to change to counter a focus shift of the one or more optical elements. In this example, the first coefficient of thermal expansion and the second coefficient of thermal expansion may be collectively configured to change the volume of the adjustment region linearly throughout at least a portion of the operational temperature range of the optical system. In this example, the first coefficient of thermal expansion and the second coefficient of thermal expansion may be collectively configured to change the volume of the adjustment region non-linearly throughout at least a portion of the operational temperature range of the optical system. In this example, the optical parameter of the optically-active region may include an optical power.

In another example, a optical system, comprises one or more optical elements, a liquid lens including an optically-active region and an adjustment region that is not optically-active, the adjustment region having a volume that corresponds to an optical parameter of the optically-active region, an adjustment structure configured to interface with the adjustment region, the adjustment structure including a first portion having a first coefficient of thermal expansion and a second portion having a second coefficient of thermal expansion that differs from the first coefficient of thermal expansion, and wherein the first portion and the second portion of the adjustment structure are configured to collectively change the volume of the adjustment region throughout an operational temperature range of the optical system, such change being based on the first coefficient of thermal expansion and the second coefficient of thermal expansion, and such change being configured to change the optical parameter of the optically-active region to counter a focus shift of the one or more optical elements. In this example, the optically-active region may be centrally located in the liquid lens, and the adjustment region may be annular and surrounds the centrally-located optically-active region. In this example, the adjustment region may include a first side and a second side that opposes the first side, and the first portion of the adjustment structure may interface with the first side and the second portion of the adjustment structure interfaces with the second side. In this example, the first portion and the second portion of the adjustment structure may cause the first side and the second side of the adjustment region to move towards each other to reduce the volume of the adjustment region as an operating temperature of the optical system increases within the operational temperature range. In this example, the first portion and the second portion of the adjustment structure may cause the first side and the second side of the adjustment region to move away from each other to reduce the volume of the adjustment region as an operating temperature of the optical system increases within the operational temperature range. In this example, the adjustment region may be separated from the optically-active region by at least one of the first portion and the second portion of the adjustment structure, and the liquid lens may include a conduit fluidly connecting the optically-active region and the adjustment region. In this example, the first coefficient of thermal expansion and the second coefficient of thermal expansion may be collectively configured to change the volume of the adjustment region linearly throughout at least a portion of the operational temperature range of the optical system. In this example, the first coefficient of thermal expansion and the second coefficient of thermal expansion may be collectively configured to change the volume of the adjustment region non-linearly throughout at least a portion of the operational temperature range of the optical system.

In another example, a camera comprises one or more optical elements, an image sensor, a liquid lens positioned intermediate the one or more optical elements and the image sensor, the liquid lens including a central optically-active region and an annular adjustment region, the annular adjustment region including a first side and a second side that opposes the first side, and the annular adjustment region having a volume that corresponds to an optical power of the central optically-active region, an adjustment structure including a first portion and a second portion, the first portion being configured to interface with the first side of the annular adjustment region, wherein the first portion has a first coefficient of thermal expansion, wherein the second portion is configured to interface with the second side of the annular adjustment region, wherein the second portion has a second coefficient of thermal expansion that differs from the first coefficient of thermal expansion, and wherein the first portion and the second portion of the adjustment structure are configured to collectively change the volume of the annular adjustment region throughout an operational temperature range of the optical system, such change being based on the first coefficient of thermal expansion and the second coefficient of thermal expansion, and such change being configured to counter a focus shift of the one or more optical elements.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An optical system, comprising:
a liquid lens including an optically-active region and an adjustment region that is not optically-active, the adjustment region having a volume that corresponds to an optical parameter of the optically-active region;
an adjustment structure configured to interface with the adjustment region, the adjustment structure including a first portion having a first coefficient of thermal expansion and a second portion having a second coefficient of thermal expansion that differs from the first coefficient of thermal expansion; and
wherein the adjustment region includes a first side that interfaces with the first portion of the adjustment structure and a second side that interfaces with the second portion of the adjustment structure, wherein the adjustment structure is configured to cause the first side and the second side to move relative to one another, based on the first coefficient of thermal expansion of and the second coefficient of thermal expansion, to thereby change the volume of the adjustment region throughout an operational temperature range of the optical system.

2. The optical system of claim 1, wherein the optically-active region is centrally located in the liquid lens, and wherein the adjustment region is annular and surrounds the centrally-located optically-active region.

3. The optical system of claim 1, wherein the first portion and the second portion of the adjustment structure cause the first side and the second side of the adjustment region to move towards each other to reduce the volume of the adjustment region as an operating temperature of the optical system increases within the operational temperature range.

4. The optical system of claim 1, wherein the first portion and the second portion of the adjustment structure cause the first side and the second side of the adjustment region to move away from each other to increase the volume of the adjustment region as an operating temperature of the optical system increases within the operational temperature range.

5. The optical system of claim 1, wherein the adjustment region is separated from the optically-active region by at least one of the first portion and the second portion of the adjustment structure, and wherein the liquid lens includes a conduit fluidly connecting the optically-active region and the adjustment region.

6. The optical system of claim 1, wherein the first portion and the second portion are collectively configured to mount the liquid lens in the optical system.

7. The optical system of claim 1, further comprising:
one or more optical elements; and
wherein the first portion and the second portion of the adjustment structure are configured to collectively change the volume of the adjustment region throughout the operational temperature range of the optical system, such change being based on the first coefficient of thermal expansion and the second coefficient of thermal expansion, and such change being configured to cause the optical parameter of the optically-active region to change to counter a focus shift of the one or more optical elements.

8. The optical system of claim 7, wherein the first coefficient of thermal expansion and the second coefficient of thermal expansion are collectively configured to change the volume of the adjustment region linearly throughout at least a portion of the operational temperature range of the optical system.

9. The optical system of claim 7, wherein the first coefficient of thermal expansion and the second coefficient of thermal expansion are collectively configured to change the volume of the adjustment region non-linearly throughout at least a portion of the operational temperature range of the optical system.

10. The optical system of claim 1, wherein the optical parameter of the optically-active region includes an optical power.

11. An optical system, comprising:
one or more optical elements;
a liquid lens including an optically-active region and an adjustment region that is not optically-active, the adjustment region having a volume that corresponds to an optical parameter of the optically-active region;
an adjustment structure configured to interface with the adjustment region, the adjustment structure including a first portion having a first coefficient of thermal expansion and a second portion having a second coefficient of thermal expansion that differs from the first coefficient of thermal expansion; and
wherein the adjustment region includes a first side that interfaces with the first portion of the adjustment structure and a second side that interfaces with the second portion of the adjustment structure, wherein the adjustment structure is configured to cause the first side and the second side to move relative to one another, based on the first coefficient of thermal expansion of and the second coefficient of thermal expansion, to thereby change the volume of the adjustment region throughout an operational temperature range of the optical system, such change being configured to change the optical parameter of the optically-active region to counter a focus shift of the one or more optical elements.

12. The optical system of claim 11, wherein the optically-active region is centrally located in the liquid lens, and wherein the adjustment region is annular and surrounds the centrally-located optically-active region.

13. The optical system of claim 11, wherein the first portion and the second portion of the adjustment structure cause the first side and the second side of the adjustment region to move towards each other to reduce the volume of the adjustment region as an operating temperature of the optical system increases within the operational temperature range.

14. The optical system of claim 11, wherein the first portion and the second portion of the adjustment structure cause the first side and the second side of the adjustment region to move away from each other to reduce the volume of the adjustment region as an operating temperature of the optical system increases within the operational temperature range.

15. The optical system of claim 11, wherein the adjustment region is separated from the optically-active region by at least one of the first portion and the second portion of the adjustment structure, and wherein the liquid lens includes a conduit fluidly connecting the optically-active region and the adjustment region.

16. The optical system of claim 11, wherein the first coefficient of thermal expansion and the second coefficient of thermal expansion are collectively configured to change the volume of the adjustment region linearly throughout at least a portion of the operational temperature range of the optical system.

17. The optical system of claim 11, wherein the first coefficient of thermal expansion and the second coefficient of thermal expansion are collectively configured to change the volume of the adjustment region non-linearly throughout at least a portion of the operational temperature range of the optical system.

18. A camera comprising:
one or more optical elements;
an image sensor;
a liquid lens positioned intermediate the one or more optical elements and the image sensor, the liquid lens including a central optically-active region and an annular adjustment region, the annular adjustment region including a first side and a second side that opposes the first side, and the annular adjustment region having a volume that corresponds to an optical power of the central optically-active region;
an adjustment structure including a first portion and a second portion, the first portion being configured to interface with the first side of the annular adjustment region;
wherein the first portion has a first coefficient of thermal expansion,
wherein the second portion is configured to interface with the second side of the annular adjustment region;
wherein the second portion has a second coefficient of thermal expansion that differs from the first coefficient of thermal expansion; and
wherein the adjustment region includes a first side that interfaces with the first portion of the adjustment structure and a second side that interfaces with the second portion of the adjustment structure, wherein the adjustment structure is configured to cause the first side and the second side to move relative to one another, based on the first coefficient of thermal expansion of and the second coefficient of thermal expansion, to thereby change the volume of the annular adjustment region throughout an operational temperature range of the optical system, such change being configured to counter a focus shift of the one or more optical elements.

\* \* \* \* \*